No. 730,513. PATENTED JUNE 9, 1903.
E. CHILDS.
PYROMETER.
APPLICATION FILED MAR. 14, 1901.
NO MODEL.
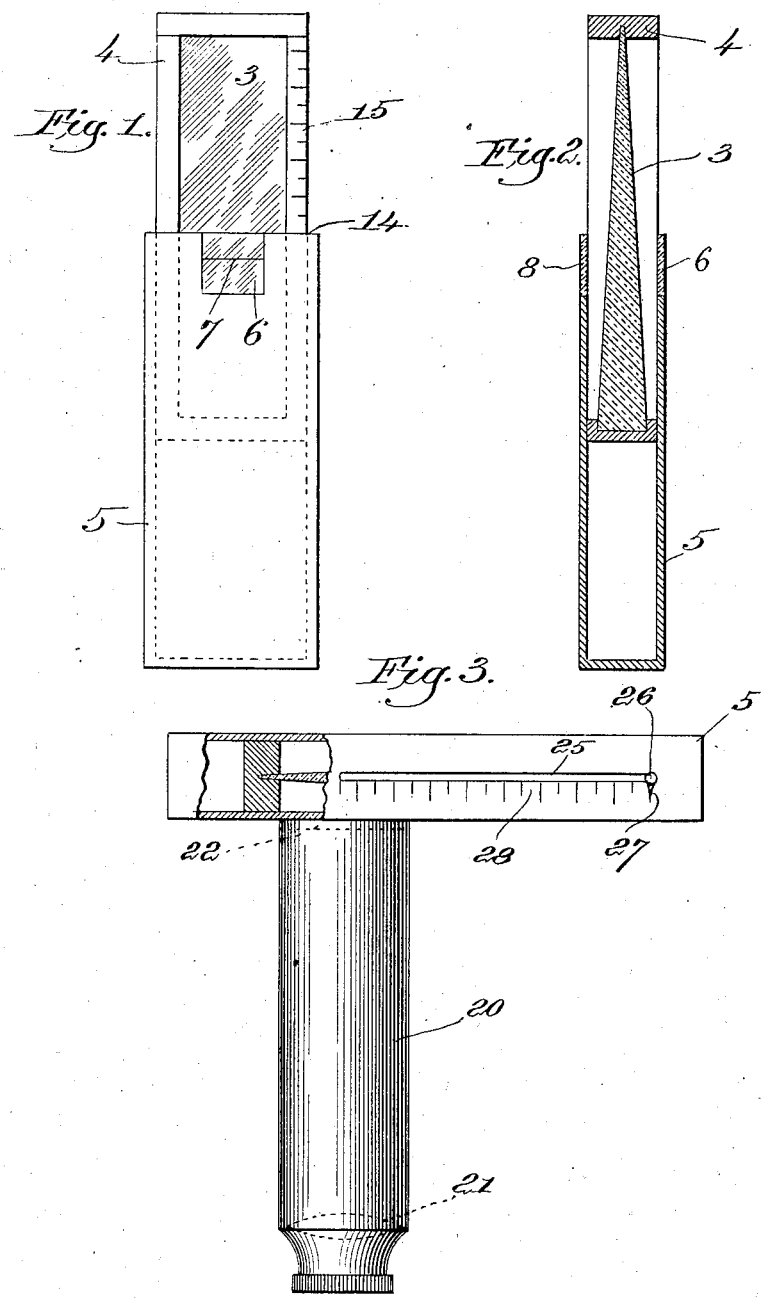
Witnesses.
Inventor.
Eugene Childs,
by Crosby Gregory
Atty's No. 730,513. Patented June 9, 1903.

UNITED STATES PATENT OFFICE.

EUGENE CHILDS, OF BOSTON, MASSACHUSETTS.

PYROMETER.

SPECIFICATION forming part of Letters Patent No. 730,513, dated June 9, 1903.

Application filed March 14, 1901. Serial No. 51,044. (No model.)

*To all whom it may concern:*

Be it known that I, EUGENE CHILDS, a citizen of the United States, residing at Boston, county of Suffolk, State of Massachusetts, have invented an Improvement in Pyrometers, of which the following description, in connection with the accompanying drawings, is a specification, like figures on the drawings representing like parts.

It is the object of my invention to provide a novel form of pyrometer for indicating the temperature of metals or other solid bodies by the intensity of the light emitted therefrom.

When any metal is heated to any degree of temperature beyond that at which a red color begins to show, the intensity of the light varies directly as the temperature—the higher the temperature the whiter and more intense the light. I make use of this well-known fact and employ a glass or other transparent body having a progressively-decreased transparency from one end to the other, the said glass being provided with a suitable scale or graduation-marks indicating the temperature.

In the use of the device the operator will look through the glass at the heated piece of metal the temperature of which is to be tested and will move the glass across the line of vision between the eye and the metal, so that said line of vision travels from the transparent end to the opaque end of the glass. As the glass is thus moved across the line of vision the light of the metal will become dimmer and will finally diappear from the view of the operator at some point on the glass dependent upon the intensity of the light, and as the intensity of the light varies with the temperature of the metal it is possible by properly adjusting the graduation-marks on the scale to tell the exact temperature of the metal by referring to the mark corresponding to that point on the glass at which the light of the heated metal disappeared from view. Preferably I will obtain a glass having a progressively-decreased transparency by using a glass having a neutral color and making the glass wedge-shaped or of a progressively-increased thickness from one portion thereof to another.

Referring to the drawings, Figure 1 is an elevation of the device. Fig. 2 is a section of one form of my improved pyrometer on line $x$, Fig. 1; and Fig. 3 shows a modification.

The glass or other transparent material having a progressively-decreased transparency from one end to the other is designated by 3, and one convenient way of obtaining this uniform variation in transparency is to color the glass with a neutral tint and make the same wedge-shaped or with a progressively-increased thickness from one end to the other, as seen in Fig. 2. For convenience in handling this glass may be mounted in a frame 4, which in turn telescopes into a case 5, and preferably the case will have in one side at its open end a piece of glass 6 or other transparent substance on which will be marked a hair-line 7, the opposite side of the case having a corresponding opening, which may be covered by a glass, as at 8, so as not to obscure the line of vision. Either the case 5 or frame 4 may be provided with a scale indicating temperatures, or the scale may be on the glass itself. In the making of the scale the points on the glass through which the light corresponding to certain known temperatures can just be seen will be ascertained by means of any standard pyrometer and marked either on the glass itself or on the frame 4 or case 5, as desired. If the markings are on the frame 4, as shown in Fig. 1, the markings for any given temperature will be so placed that as the point on the glass at which the light corresponding to the given temperature becomes invisible or fails to pass through the glass (is directly underneath the hair-line 7) the corresponding marking will be opposite some fixed indication mark or pointer, the indication-mark in the embodiment of my invention in Fig. 1 being the end 14 of the casing 5. With the division-marks of the scale properly placed the temperature of any body which is hot enough to emit light can be readily ascertained by looking at the heated body through the glass and moving the glass back and forth across the line of vision until the point is reached where the light from the heated body becomes invisible or where the opaqueness of the glass prevents the transmission through it of the light from the heated body. The markings on the scale at the point corresponding to this point on the glass will give the temperature of the body.

With a device such as shown in Figs. 1 and 2 the instrument will be so held that the hair-line 7 is in the line of vision, and the frame 4 will then be moved back and forth in the case until the light from the heated body disappears exactly at the hair-line 7. The point on the scale 15 registering with the indication-point 14 will then give the temperature desired.

Fig. 3 illustrates a slightly-modified structure embodying my invention, wherein the casing 5' is extended so as to entirely inclose the glass 3, and an eyepiece 20, provided with lens 21, is attached to said casing, an opening being provided in the casing opposite the eyepiece in order that the object may be seen through the glass. A plain glass 22 (see dotted lines) at the inner end of the eyepiece may be provided with a hair-line, which hair-line serves the same purpose as the hair-line 7 in Fig. 1. The casing 5' is provided with a slot 25, through which projects a finger-piece 26, provided with a pointer 27, said pointer cooperating with a scale 28 on the casing. In using this form of the invention the heated article is looked at through the eyepiece 20, and the finger-piece 26 is manipulated to move the glass back and forth until the point is reached where the light becomes invisible immediately under the hair-line. The readings on the scale will then give the temperature of the heated body. The lens 21 enables the exact point where the light became invisible to be more accurately ascertained.

My invention is especially useful in tempering steel or other metals, for in the tempering process the metal is heated up to a predetermined temperature, dependent on the character of the metal and the hardness to which it is to be tempered, when it is cooled suddenly, generally by plunging the same into cold water. It requires much skill to ascertain from the color of the metal the exact temperature thereof by the naked eye, and consequently it is difficult to properly temper the metal.

In using my device as an aid in tempering metal and having given the exact temperature to which any particular character or grade of metal should be heated before plunging the same into the water the instrument will be so adjusted that the pointer or indication-mark will indicate this required temperature. The operator will then look at the metal as it heats through the instrument, the instrument preferably being moved back and forth, so that the hair-line will pass back and forth across the line of vision between the eye and the metal, and when the metal has been brought to such a temperature that the light emitted therefrom disappears from view just as the hair-line comes between the eye and the metal it will be evident that the metal is of the correct temperature for tempering.

It will be obvious that my invention may be used in other ways than as an aid in the process of tempering metal and also that the details of the structure of the device may be varied in many ways without departing from the spirit of my invention. For instance, it is not necessary that the glass be mounted in a frame and the frame carried in a casing, as illustrated, for simply the glass or other transparent material, which material has a progressively-decreasing transparency from one portion to another and which has a scale properly marked thereon, would embody one form of my invention. The manner of mounting the glass or other transparent material may also be varied, and the scale may be placed in any suitable or convenient position so long as the markings thereon in their cooperation with the fixed pointer or indication-mark correspond to certain points on the glass.

The progressively-decreased transparency of the glass or other transparent body may be obtained in other ways than by making the glass wedge shape; but I prefer the neutral tint of glass of wedge-shape construction, for the neutral tint does not interfere with the transmission through the glass of rays of colored light, but affects only the intensity of the light. It is not necessary that the transparent body be glass, as any suitable transparent material may be used provided it can be constructed with a progressively-increased transparency from one end to the other, and in the above description the term "glass" is used to designate any suitable transparent material.

Having fully described my invention, what I claim as new, and desire to secure by Letters Patent, is—

1. In a pyrometer, a casing having a hair-line, a transparent glass body of progressively-increasing thickness, said glass being movable relative to the casing and of a neutral tint to transmit light-rays of any color with equal facility, and a scale having markings corresponding to the points on the transparent body, at which the light-rays, due to a certain predetermined temperature, become invisible when looked at through said glass body.

2. In a pyrometer, a casing having a single observation-opening provided with a glass having a mark thereon, a frame slidably supported in said casing, said frame carrying a wedge-shaped glass of neutral tint and progressively varying transparency from end to end, the taper of the glass extending in the direction of movement of the frame, a scale having markings to indicate temperatures on one of the parts having relative movement, said scale extending in the direction of movement, and an indication-mark fixed on the other of said parts.

3. A pyrometer comprising a frame containing a neutral-tinted glass of progressively-increased thickness from one portion to another, and a casing in which said frame is slidably mounted, said casing having an observation-opening, a hair-line across the same and transverse to the line of movement of the frame, one of said parts having a scale extending in the direction of movement of the glass, and the other of said parts having a coöperating indication-mark, the markings on the scale indicating temperatures and being so graduated that when the glass is moved into such a position that the portion of the glass immediately under the hair-line will just intercept the light emitted from an incandescent body, the indication-mark will give the temperature of the said incandescent body.

4. A pyrometer, comprising a casing having a hair-line, a transparent body supported by the casing and capable of movement relative thereto, said body being of progressively-increasing thickness from one end thereof to the other, and of a neutral tint to transmit light-rays of any color with equal facility, a scale on one of said parts, and an indication-mark coöperating with the scale, said scale having markings corresponding to the points on the transparent body at which the light-rays corresponding to certain predetermined temperatures become invisible when looked at through said body.

In testimony whereof I have signed my name to this specification in the presence of two subscribing witnesses.

EUGENE CHILDS.

Witnesses:
JOHN C. EDWARDS,
LOUIS C. SMITH.